United States Patent [19]

Peppel

[11] 4,099,603
[45] Jul. 11, 1978

[54] LOCK-UP CLUTCH CONTROL VALVES

[75] Inventor: Jon H. Peppel, Horton, Mich.

[73] Assignee: Clark Equipment Company, Buchanan, Mich.

[21] Appl. No.: 773,868

[22] Filed: Mar. 3, 1977

[51] Int. Cl.² ............................................. F16H 45/02
[52] U.S. Cl. .............................. 192/3.31; 192/103 FA
[58] Field of Search ...................... 192/3.3, 3.31, 3.28, 192/3.57, 103 FA; 137/53, 56, 57, 58; 74/732, 733

[56] References Cited

U.S. PATENT DOCUMENTS

| | | | |
|---|---|---|---|
| 2,894,609 | 7/1959 | Tattersall | 192/3.3 |
| 2,964,959 | 12/1960 | Beck et al. | 192/3.3 X |
| 3,240,308 | 3/1966 | Frost | 192/3.3 X |
| 3,542,175 | 11/1970 | Olson et al. | 192/3.33 |
| 3,896,910 | 7/1975 | Audiffred et al. | 192/3.57 |

*Primary Examiner*—James F. Coan
*Attorney, Agent, or Firm*—Ernst H. Ruf

[57] ABSTRACT

Control valve assemblies for a lock-up clutch in a vehicle drive system, wherein a torque converter normally couples a prime mover with a transmission, vary the degree of engagement of the lock-up clutch with respect to prime mover rotational speed within a predetermined speed range. In the control valve assemblies, a centrifugal valve selectively communicates the fluid pressure operated lock-up clutch with a source of pressure and a fluid drain, with the centrifugal valve having rotor means drivably interconnected with the prime mover. Spool means slidably received within a rotor bore are outwardly displaceable with a first force while resilient bias means oppose and equalize this first force when the prime mover reaches a first predetermined speed, with valve means regulating the flow of pressurized fluid from the rotor means. Reaction means augment the force of the bias means and permits a gradual engagement of the lock-up clutch which progressively increases until the prime mover attains a second higher predetermined speed at which time the lock-up clutch is fully engaged. In one instance a modulating balance valve varies the pressure in the lock-up clutch consistent with the pressure produced by the action of the centrifugal valve.

13 Claims, 4 Drawing Figures

LOCK-UP CLUTCH CONTROL VALVES

BACKGROUND OF THE INVENTION

1. Field Of The Invention

The field of art to which this invention pertains includes a control valve means for operating a lock-up clutch associated with a torque converter in a vehicle drive system wherein the torque converter couples the prime mover with a transmission. More particularly, the control valve means are adapted to regulate engagement and disengagement of the clutch with respect to prime mover rotational speed within a predetermined speed range.

2. Description Of The Prior Art

A torque converter, of course, serves to fluidically couple the prime mover with the transmission. However, in order to permit the bypassing of the fluid drive and to establish a more efficient direct mechanical drive between the prime mover and the transmission, when operationally feasible, a lock-up clutch is couplingly interposed between the torque converter input and output members. It is desirable to vary the degree of engagement of the lock-up clutch with respect to prime mover rotational speed in order to maintain prime mover rotational speed within its most favorable torque range. Therefore, below this desired torque range, the lock-up clutch is fully disengaged, while above this range it is fully engaged and within the range it is modulated therebetween.

Examples of prior art patents that disclose lock-up clutch control valves include U.S. Pat. Nos. 3,857,302 to Morris; 3,985,046 to Morris et al; 3,949,847 to Hoehn; 3,390,594 to Gillespie; and 3,897,698 to Ohsaka.

SUMMARY OF THE INVENTION

The lock-up clutch control valve assemblies of this invention vary the degree of engagement of the lock-up clutch with respect to prime mover rotational speed. For instance, when prime mover speed is lowered below a first predetermined speed, the control valve assembly acts to fully disengage the lock-up clutch thereby unloading the prime mover and allowing its rotational speed to again increase toward its desired operating speed. At this point, the control valve assembly starts a gradual engagement of the lock-up clutch which progressively increases until the prime mover obtains a second higher predetermined rotational speed, at which point the lock-up clutch is fully engaged thereby directly coupling the prime mover to the transmission.

The control valve assemblies of this invention provide a fluid signal to the lock-up clutch for varying the degree of engagement thereof with respect to prime mover rotational speed, wherein the control valve assembly basically includes a centrifugal valve for selectively communicating a source of fluid pressure with the lock-up clutch and a fluid drain and a modulating balance valve for varying the pressure in the lock-up clutch in the manner so as to maintain the same pressure as is produced by the centrifugal valve.

In the centrifugal valve, rotor means are journalled within a valve body central cavity, with the rotor radial bore having a peripheral groove communicating with the fluid pressure. Spool means within the rotor bore are outwardly displaceable with a first force that is a function of the rotational speed of the prime mover. Resilient bias means oppose this first force with a second force, these forces being substantially equal when the prime mover reaches a first predetermined speed. Valve means regulates the flow of pressurized fluid from the rotor means when the prime mover exceeds the first predetermined speed, at which time there is an initial engagement of the lock-up clutch. Reaction means within the spool means produce a third force that augments the second force thereby gradually increasing clutch engagement over a predetermined increasing speed range. When the first force exceeds the combination of the second and third forces, the lock-up clutch is fully engaged. Constriction means fluidically interconnected with and located downstream from the centrifugal valve bleeds off greater or lesser amounts of hydraulic fluid through the centrifugal valve, with one embodiment of the control valve of this invention having constriction means integral with the modulating balance valve which functions to maintain the same pressure in the lock-up clutch as is produced by the action of the centrifugal valve.

The balance valve in turn has a spool element disposed within a valve body wherein the spool element is adapted to axially shift within the valve bore so as to either vent or pressurize an outlet port, connected to the lock-up clutch, so as to maintain the desired pressure in the lock-up clutch.

BRIEF DESCRIPTION OF THE DRAWINGS

The features and advantages of the present invention will be more readily understood by persons skilled in the art when following the detailed description in conjunction with the drawings, wherein.

DESCRIPTION OF THE PREFERRED EMBODIMENTS

Figure 1:
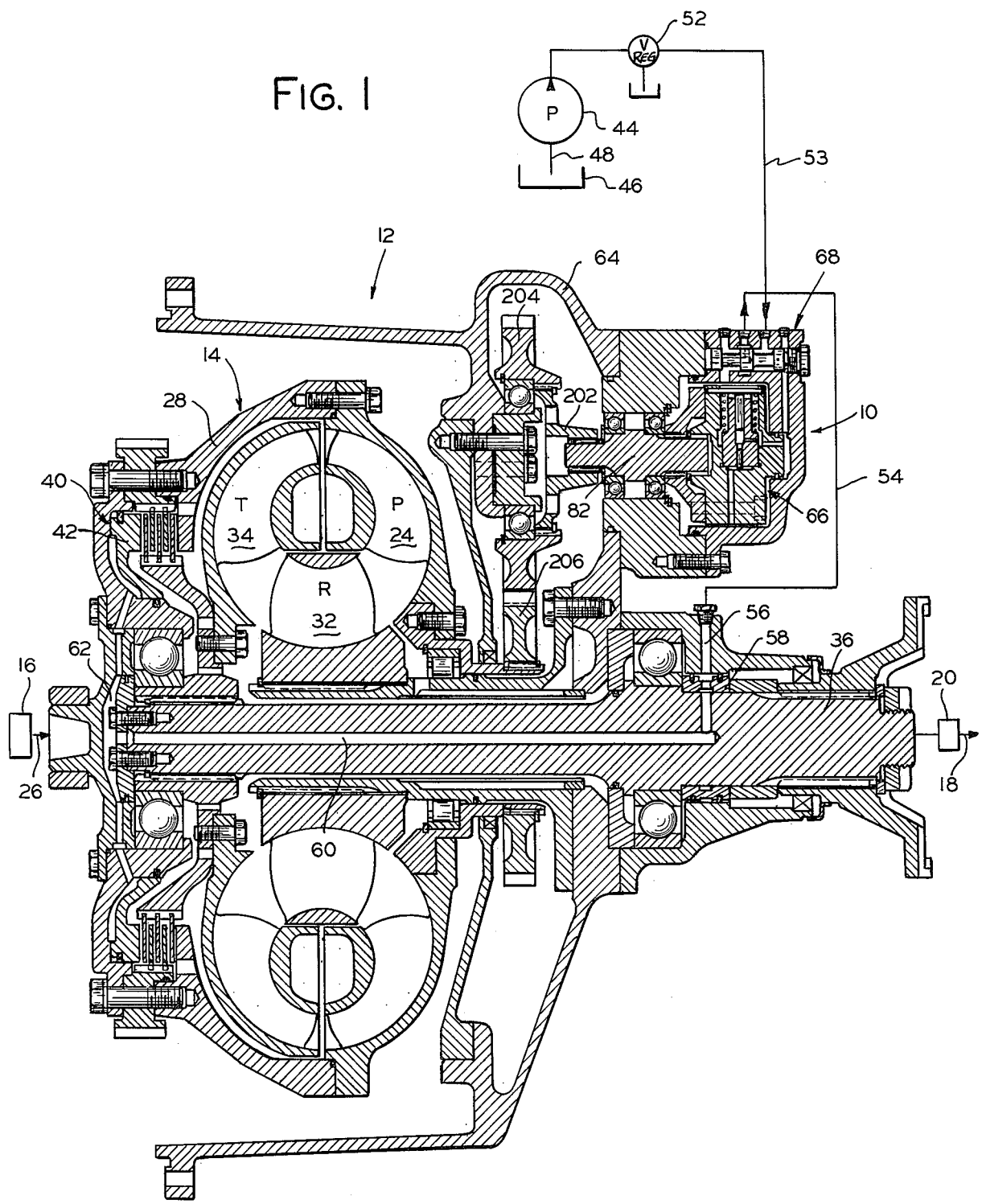
FIG. 1 is a partially schematic sectional view showing one embodiment of the control valve assembly together with a torque converter and its associated lock-up clutch.

Referring now to the drawings, specifically to FIG. 1, a control valve assembly 10 is shown operatively connected to a vehicle drive system 12 to control the action of a torque converter 14 which is itself a component of the drive system. Drive system 12 may itself be of conventional construction, and, therefore, will be described herein only to the extent necessary to understand the interaction of control valve 10 therewith.

Drive system 12 is connected between a prime mover 16, such as an internal combustion engine, and a wheel drive line 18. Drive system 12 also includes a transmission 20 which may, for example, be of the power shift type, such as disclosed in prior U.S. Pat. No. 3,126,752 in which different drive ratios are achieved by pressurizing selected combinations of a series of fluid pressure-operated clutches associated with rotatable gear elements. In drive system 12, transmission 20 is remotely mounted with reference to torque converter 14 in a manner well known in the art.

Torque converter 14 may also be of conventional construction, and thus may have a rotatable impeller 24 coupled to a prime mover output element 26 via an annular input member 28. Torque converter 14 also has a stationary reaction element 32 and a turbine element 34 which is mechanically coupled to torque converter output shaft 36, and which is fluid coupled to impeller 24 so as to establish a fluid drive path between the prime mover and the transmission when so desired.

In order to permit the bypassing of the fluid drive path and thereby establish a more efficient direct mechanical drive between the prime mover and the transmission, when operationally feasible, a normally disengaged lock-up clutch 40 is couplingly interposed between input member 28 and turbine element 34. Lock-up clutch 40 may be engaged, to essentially inactivate torque converter 14, by applying pressurized fluid to one side of an actuator piston and cylinder assembly 42 in a manner to be set forth in more detail hereinafter. Lock-up clutch 40 and piston and cylinder assembly 42 may be of any suitable conventional construction and preferably take the form of a multiple-plate clutch.

Torque converter impeller 24 may also drive one or more charge or auxiliary pumps, one of which is schematically shown at 44, of any well known construction, with at least one of these pumps serving to provide pressurized fluid to operate the various fluid actuated clutches as well as to lubricate the gears and bearings associated with transmission 20. In order to selectively pressurize lock-up clutch 40, in a manner to be described hereinafter, pump 44 draws and pressurizes fluid from a fluid supply reservoir or sump 46 from which fluid is drawn through a conduit 48. A pressure regulator 52 limits the maximum pressure in the system, with conduit 53 linking regulator 52 with valve 10. After passing through control valve assembly 10, the pressurized fluid continues via conduits 54 and 56, apertured sleeve 58, as well as conduits 60 and 62 to the side of actuator piston and cylinder assembly 42 facing away from torque converter 14.

The purpose of lock-up clutch control valve assembly 10 is to vary the degree of engagement of lock-up clutch 40 with respect to prime mover rotational speed, the intent being to maintain prime mover rotational speed within a predetermined range so as to take advantage of the prime mover's most favorable torque range. For example, when prime mover speed is lowered below a first predetermined speed, control valve assembly 10 acts to fully disengage lock-up clutch 40, with this disengagement fully unloading the prime mover and therefore allowing its rotational speed to again increase toward its desired operating speed. When the prime mover speed again reaches the first predetermined speed, control valve assembly 10 starts a gradual engagement of lock-up clutch 40 which progressively increases until the prime mover attains a second predetermined rotational speed, higher than the first predetermined rotational speed, at which point lock-up clutch 40 is fully engaged once more. This full re-engagement of clutch 40 causes the transmission of more prime mover torque, thereby lowering prime mover rotational speed. As previously noted, lock-up clutch 40 is used in torque converter 14 for selectively inactivating the torque converter proportional to prime mover rotational speed by tying together the torque converter input and output elements, namely impeller member 24 and turbine member 34.

Figure 2:
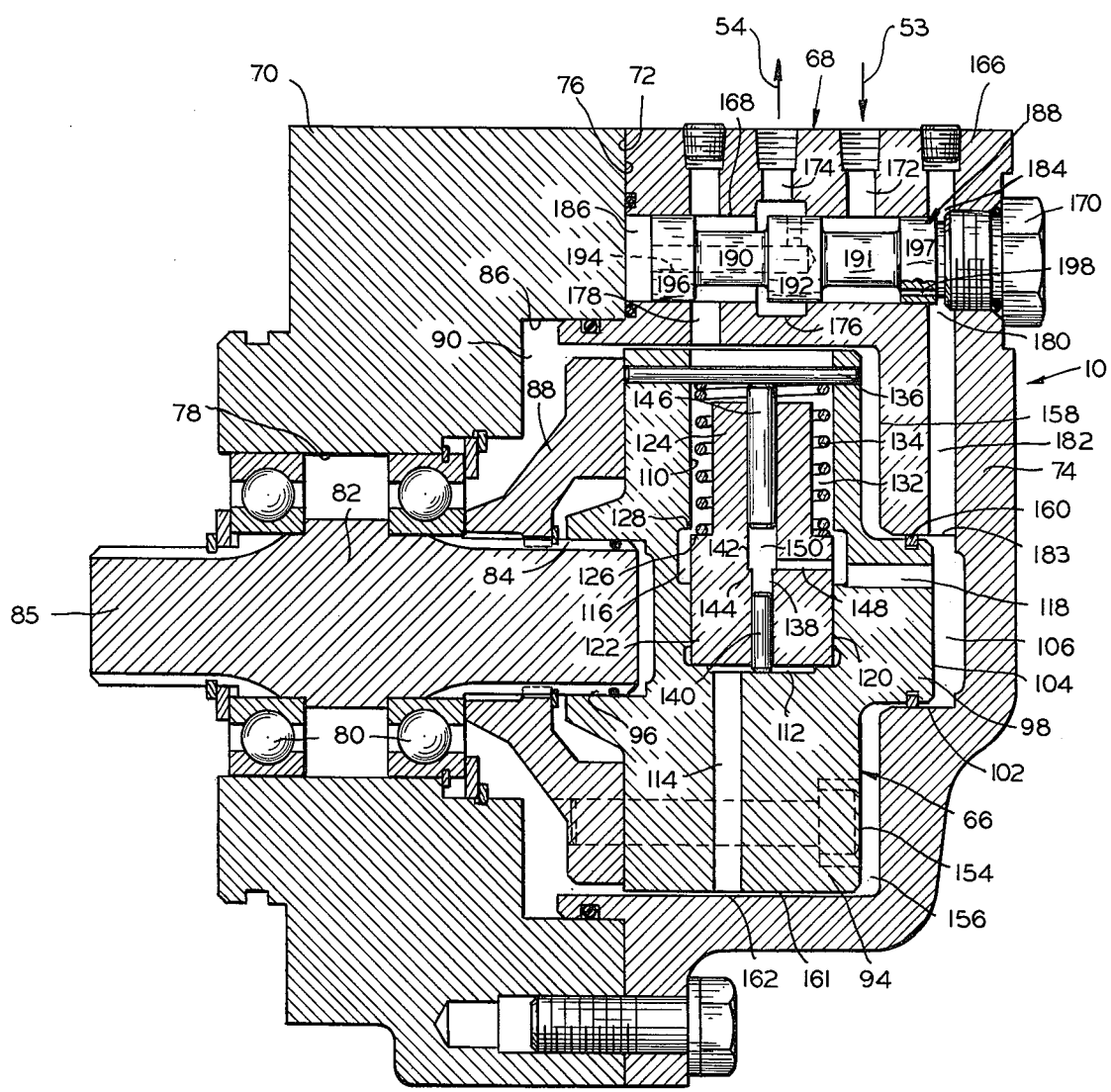
FIG. 2 is an enlarged sectional view of the control valve assembly shown in FIG. 1 with the valve assembly being shown in lock-up clutch disengaged position.

Control valve assembly 10, best seen in FIG. 2, is rigidly attached to torque converter housing 64 and is basically made up of centrifugal valve or governor 66 and modulating balance valve 68 working in conjunction therewith. Centrifugal valve 66 includes a valve body having an annular housing block 70, one end face portion of which abuts and is attached to torque converter housing 64, and whose other annular outer end face portion 72 abuts against and is attached to a flanged end portion 76 of housing cover and spool block member 74.

Annular housing block 70 has a stepped axial bore whose bore portion 78 contains a pair of spaced bearing members 80 that rotatably support a drive shaft 82 splined on both ends. Portion 84 of drive shaft 82 extends into housing block bore portion 86 and has a flange member 88 splined thereto for conjoint rotation therewith. Flange member 88 is contained within a cavity 90 formed between annular housing block 70 and housing cover and spool block member 74.

Also contained in cavity 90 is the rotor and spool assembly of centrifugal valve 66 which includes a rotor 94 that is fixedly secured to flange member 88, and therefore is capable of rotation therewith. Rotor 94 includes a hub portion 96 that is physically located on drive shaft portion 84 and cylindrical portion 98 that is axially aligned with hub portion 66, with cylindrical portion 98 being received in hub portion 102 of housing cover and spool block member 74. The end face 104 of cylindrical portion 98 is spaced from an end face of hub portion 102 so as to define a cavity 106 therebetween.

Rotor 94 has a radial bore 110 whose inner end face 112 is connected with cavity 90 via radial vent conduit 114. Radial bore 110 is provided with an annulus or groove 116 which in turn is connected with cavity 106 via conduit 118 is cylinder portion 98.

Slidingly received within radial bore 110 is stepped rotor spool 120 whose larger diameter portion 122 is closely slip fitted relative to radial bore 110. Smaller diameter portion 124 adjoins bore portion 122 at annular connecting surface 126. Connecting surface 126, at the rest position of centrifugal valve 66, is radially spaced from upper edge 128 of groove 116 and can coact with connecting surface 126 to act as a valve and throttle the flow of pressurized fluid from groove 116 into annular space 132 between radial bore 110 and spool small diameter portion 124. Connecting surface 126 has the further function of supporting one end of a biasing means or spring 134 that surrounds spool portion 124, with the other end of biasing means 134 abutting a retainer pin 136 extending across bore 110.

Rotor spool 120 is provided with a stepped longitudinal bore whose smaller diameter portion 138, in spool portion 122, is provided with a close fitting first reaction pin 140, one end of which abuts end face 112 of rotor bore 110, and the other end face of which is longitudinally spaced a short distance from the inner end of bore portion 138. Rotor spool large diameter bore portion 142 merges into small diameter bore portion 138 via annular connecting surface 144. Closely fitted within bore portion 142, but axially spaced a short distance from connecting surface 144, is second reaction pin 146, whose outer end abuts retainer pin 136. A small radial passage 148 connects bore portion 142, at connecting surface 144, with rotor groove 116 in a manner so that even after the flow from groove 116 into annular space 132 is blocked (via connecting surface 126 and groove edge 128), there is still fluid communication between cavity 106 and cavity or reaction chamber 150, the latter being the cavity between the inner ends of first and second reaction pins 140, 146, respectively. It should be noted that cavity 106 is sealed from cavity 156 between rotor side face 154 and inner annular surface 158 of housing cover and spool block member 74 via sealing ring 160 on rotor cylindrical portion 98. It should also be noted that a peripheral clearance 161 exists between rotor 94 and the inner peripheral surface 162 of housing cover and spool block member 74. Peripheral clearance 161 permits the outward flow of pressurized fluid from annular space 132 as well as fluid leakage, if any, from cavity 156 and vent conduit 114 into cavity 90 and therefrom over flange member 88 through bearing members 80 into the interior of the torque converter and back to its drain or sump.

Turning now to modulating balance valve 868, it will be seen that housing cover and spool block member 74 has a spool block portion 166 that is provided with through bore 168 closed on its inner end by housing block end face 72 and on its outer end by plug member 170. Bore 168 is provided with an inlet port 172 which is also connected to supply conduit 53. An outlet port 174 is connected to clutch conduit 54 and to bore 168 via bore groove 176. Also in communication with bore 168, and leading into inner peripheral surface 162 of housing cover and spool block member 74, is vent port 178. Communicating on one end with bore 168, in the area of plug member 170, is centrifugal valve outlet port 180 which merges into conduit 182 whose other end merges into inlet port 183 which communicates with cavity 106 adjacent to rotor cylindrical portion 98.

Slidingly disposed within spool block bore 168, between end cavities 184 and 186, respectively, is balancing spool 188. Two grooves 190, 191 in balancing spool 188 are spaced apart via spool center land portion 192, with bore groove 176 being in constant communication with end cavity 186 via spool internal conduit 194. Grooves 190, 191 are spaced from cavities 186, 184 via spool land portions 196, 197, respectively. In addition, balance valve inlet port 172 is in constant communication with end cavity 184 via balance spool groove 191 and construction means or orifice 198, the latter extending longitudinally through spool land portion 197.

Returning now to FIG. 1, it will be seen that centrifugal valve 66 is rotated via drive shaft 82 whose inner end 85 is splined to a connecting sleeve 202 which in turn is splined to a gear 204 journalled on the torque converter housing and in constant mesh with a further gear 206 that is fixedly secured to and rotates with impeller 24. Therefore, it should be understood that centrifugal valve 66 rotates in direct proportion to prime mover rotational speed and provides a fluid signal to lock-up clutch 40 having a pressure increase as a function of prime mover rotational speed.

Figure 4:
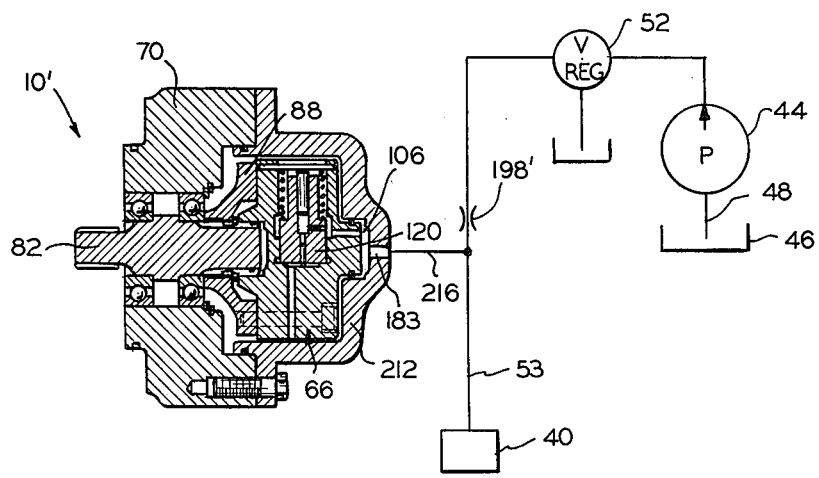
FIG. 4 is another embodiment of the lock-up clutch control valve assembly of this invention.

Turning now to FIG. 4, there is shown another embodiment 10' of the lock-up clutch control valve assembly of this invention. Valve assembly 10' utilizes centrifugal valve 66 which has already been previously described with reference to FIGS. 1 and 2, but does not utilize balance valve 68 and therefore makes use of housing cover 212 in lieu of housing cover and spool block member 74. To the extent that control valve assembly 10' is the same as previously described control valve assembly 10 in FIGS. 1, 2 and 3, reference is made here to the preceding description, with like reference numerals being applied to like parts.

In FIG. 4, in order to selectively pressurize schematically shown lock-up clutch 40, pump 44 again draws and pressurizes fluid from fluid reservoir 46 through conduit 48. Pressure regulator 52 limits the maximum pressure in the system, with supply conduit 48 being restricted by an orifice or constriction means 198' upstream to both lock-up clutch 40 and centrifugal valve 66. Basically, the pressure in lock-up clutch 40 is controlled by, in turn, controlling the flow through constriction means or orifice 198' by bleeding off greater or lesser amounts of pressurized fluid through centrifugal valve 66. Centrifugal valve 66 of valve assembly 10' is connected to supply conduit 53, downstream from constriction means 198' by branch conduit 216 connected to cavity 106 via centrifugal valve inlet port 183. As best seen in FIG. 1, the clutch plate side of actuator piston and cylinder assembly 42, in lock-up clutch 40, is open to torque converter pressure which, of course, works against the engagement pressure supplied through conduit 53, with the former tending to disengage clutch 40.

Centrifugal valve inlet port 183, downstream from constriction means 214, is, of course, exposed to the same pressure as the engagement pressure of lock-up clutch 40. This engagement pressure is communicated via conduit 118 to rotor bore groove 116 and vented outwardly therefrom into annular space 132, from thence it returns the torque converter sump in the manner already previously described.

In operation, since centrifugal valve 66 is driven by impeller 24 at a speed proportional to prime mover rotational speed, rotor spool 120 is forced radially outwardly due to centrifugal force, with this outward movement being resisted by the opposing action of spring 134. Below a first predetermined rotational speed (such as 1980 rpm, for example), the weight of spring 134 is greater than the centrifugal force of rotor spool 120, with the former, therefore, holding rotor spool 120 in its rest position with the result that pressurized fluid continues to vent through annular space 132. This centrifugal force is substantially proportional to the square of the rotating speed of the prime mover.

As the prime mover rotational speed increases, a first predetermined rotational or critical speed is reached where the centrifugal force acting on rotor spool 120 becomes equal to the installed weight of spring 134. Above this first speed there is centrifugal outward movement of rotor spool 120, thereby progressively decreasing the fluid flow from groove 116 into annular space 132. As pressure starts to build up in groove 116, it increases the pressure in spool cavity 150 which assists spring 134 in opposing the outward movement of rotor spool 120. It should, of course, be understood that the resultant reaction on rotor spool 120 via reaction pins 140 and 146 is a function of the difference in the cross-sectional areas of these two pins times the pressure in spool cavity 150.

As the prime mover rotational speed increases further, the hydraulic pressure also increases as required to balance the additional centrifugal force of rotor spool 120 against the reaction pin resulting force. This increased hydraulic pressure is, of course, communicated to the actuator piston and cylinder assembly 42 which in turn transmits this increased pressure to further reduce the slippage within lock-up clutch 40, thereby transmitting increased torque therethrough.

When the centrifugal force on rotor spool 120 can no longer be balanced by the force of spring 134 plus the reaction pin resultant force, the flow from groove 116 into annular space 132 is completely blocked (via connecting surface 126 and groove edge 128) and maximum clutch pressure is reached. Rotor spool 120 is now in the position shown in FIG. 3. At this time, at a second predetermined rotational or critical speed (such as, for example, 2020 rpm), lock-up clutch 40 is fully engaged thereby inactivating torque converter 14 by mechanically tying together impeller member 24 and turbine member 34.

With decreasing prime mover rotational speed, the input pressure to lock-up clutch 40 decreases in the manner substantially reverse to the previously described increase in pressure.

It should be understood that the speed with which centrifugal valve 66 reacts can be controlled by the weight of spool return spring 34 in that the spring weight can be designed to equal the centrifugal force acting on rotor spool 120 at the desired first predetermined speed. The rotational speed range over which the increase (or decrease) in pressure occurs is, of course, related to the diameters and the cross-sectional areas of the two reaction pins. The smaller the difference in the cross-sectional areas of the two pins, the less reaction force is available from the hydraulic pressure, which results in a more sensitive valve. If so desired, only a single, small diameter reaction pin, one end of which bears against retainer pin 136, may be utilized.

It is the function of centrifugal valve 66 to control the hydraulic pressure in conduit 48 downstream from constriction means 198' so as to vary or modulate the engagement of lock-up clutch 40 with respect to prime mover rotational speed in the manner previously described. Thus, in the FIG. 4 embodiment, the hydraulic pressure acting on lock-up clutch 40 is modulated by bleeding off greater or lesser amounts of hydraulic fluid through centrifugal valve 66, with valve 66 acting in the manner of a governor.

Figure 3:
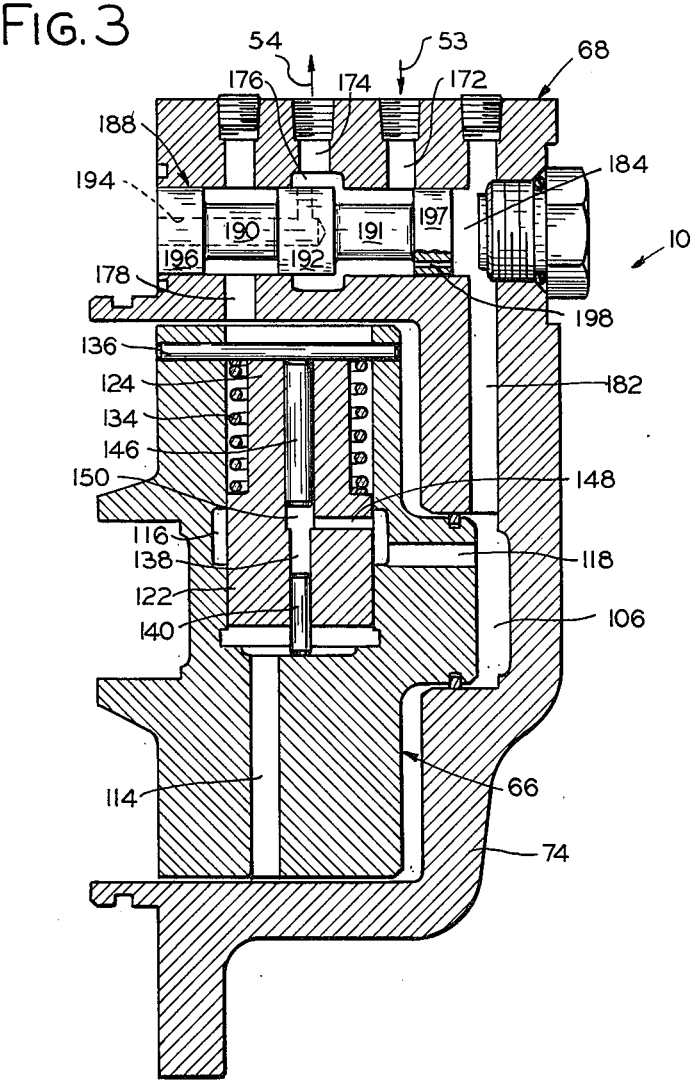
FIG. 3 is a simplified view of FIG. 2 wherein the valve assembly is shown in lock-up clutch engaged position.

Returning now to the embodiment shown in FIGS. 1, 2 and 3, control valve assembly 10 utilizes modulating balance valve 68 in conjunction with centrifugal valve 66 so as to modulate and supply the required hydraulic pressure to lock-up clutch 40. The operation of centrifugal valve 66 is identical to that previously described with reference to control valve assembly 10' of FIG. 4 and need, therefore, not be repeated here.

In the operation of modulating balance valve 68 (best seen in FIGS. 2 and 3), pressurized fluid is always supplied to inlet port 172 and balance spool groove 191. This pressurized fluid subsequently flows through restricted passage or orifice 198 to both provide pressure on one end of balance spool 188, in end cavity 184, and to provide a supply of pressurized fluid to centrifugal valve 66 via outlet port 180 and conduit 182.

The hydraulic pressure in end cavity 184 varies with prime mover rotational speed, with this pressure being controlled by centrifugal valve 66. Increasing hydraulic pressure in cavity 184, acting against one end of balancing spool 188, progressively axially translates spool 188 so as to progressively connect inlet port 172 with groove 176 and clutch outlet port 174 via spool groove 191. Clutch outlet port 174 is connected to lock-up clutch 40 via conduits 54, 56, apertured sleeve 58, as well as conduits 60 and 62. Balance spool groove 176 always communicates with balance valve end cavity 186 via conduit 194 so that balance spool 188 will slide toward one end or the other so as to either vent or pressurize clutch outlet port 174 as required to equalize the pressure at each end of spool 188 (in opposed end cavities 184 and 186). This equalizing of the pressures in cavities 184 and 186 thus maintains the same pressure in lock-up clutch 40 as produced by centrifugal valve 66. As best seen in FIGS. 2 and 3, spool central land portion 192 controls balance valve groove 176 by permitting alternate communication with grooves 190 (FIG. 2) and 191 (FIG. 3). Valve groove 190 is, of course, in constant communication with vent port 178 so as to permit the venting or draining of lock-up clutch 40 when groove 176 is in communication with groove 190. FIG. 2 shows valves 66 and 68 in their open or lock-up clutch disengaged positions, whereas FIG. 3 shows them in their closed or lock-up clutch engaged position.

It should be clear at this time that it is the function of modulating balance valve 68 to permit sufficient fluid flow to lock-up clutch 40, either by venting or pressurizing, to modulate or vary the pressure of lock-up clutch 40 in a manner so as to maintain the same pressure in lock-up clutch 40 as is produced by the action of centrifugal valve 66. It should also be understood that the action of balance valve 68 is controlled by the action of centrifugal valve 66. The use of modulating balance valve 68 with constriction means 198 in control valve assembly 10 in lieu of only constriction means 198' in control valve assembly 10' is advantageous in that balance valve 68 reduces the amount of hydraulic fluid that must flow through centrifugal valve 66.

From the foregoing, it is believed that those familiar with the art will readily recognize and appreciate the novel concepts and features of the present invention. Obviously, while the invention has been described in relation to only two preferred embodiments, numerous variations, changes and substitutions of equivalents will present themselves to persons skilled in the art and may be made without necessarily departing from the scope and principles of this invention. As a result, the embodiments described herein are subject to various modifications, changes and the like, with the scope of this invention being determined solely by reference to the claims appended hereto.

What is claimed is:

1. In a vehicle drive system including a torque converter for coupling a prime mover with a transmission, a hydraulically actuated lock-up clutch arranged to selectively bypass said torque converter, and mechanically couple said prime mover directly with said transmission, a lock-up clutch control valve assembly for varying the degree of engagement of said lock-up clutch with respect to prime mover rotational speed within a predetermined speed range, said control valve assembly including:

a source of regulated fluid under pressure;
a centrifugal valve for selectively communicating said source with said lock-up clutch and with a fluid drain; and
constriction means fluidically interconnected with and located downstream from said centrifugal valve;

said centrifugal valve comprising:
 a. a stationary housing and cover defining a first cavity;
 b. a rotor rotatably journalled within said first cavity and drivably interconnected with said prime mover, said rotor including a radial bore having a peripheral groove connected with said source via a rotor inlet conduit;
 c. a rotor spool slidably received within said radial bore and radially outwardly displaceable by centrifugal force that is a function of the rotational speed of said prime mover;
 d. bias means for inwardly biasing said rotor spool in opposition to said centrifugal force;

e. a rotor outlet conduit;

f. valve means for regulating the flow of pressurized fluid from said rotor groove into said rotor outlet conduit; and g. said rotor spool further including both a reaction member within said rotor spool, relatively movable to one another, and a spool cavity that is in constant communication with said rotor groove and said reaction member, with the resultant reaction on said rotor spool augmenting the force of said bias means whereby when said prime mover reaches a first predetermined speed said control valve assembly starts a gradual engagement of said lock-up clutch which progressively increases until said prime mover attains a second higher predetermined speed at which point said lock-up clutch is fully engaged.

2. The vehicle drive system of claim 1 wherein said rotor outlet conduit is defined between said rotor radial bore and a first diameter portion of said rotor spool.

3. The vehicle drive system of claim 1 wherein said valve means is defined by a second diameter portion of said rotor spool and an edge portion of said rotor groove.

4. The vehicle drive system of claim 1 wherein said rotor spool further includes a spool bore portion and said reaction member takes the form of a first reaction pin located within said spool bore portion, with said spool bore portion and an end of said first reaction pin defining said spool cavity wherein the cross-sectional area of said first reaction pin times the pressure in said spool cavity determines the range between the start of and full engagement of said lock-up clutch.

5. The vehicle drive system of claim 4 wherein said spool bore is stepped and contains a second reaction pin of a different cross-section than and in opposition to said first reaction pin, and said spool cavity is located intermediate said reaction pins, with said reaction force being the difference in cross-sectional areas of said reaction pins.

6. The vehicle drive system of claim 1 wherein said cover includes a hub portion and said rotor includes a concentric cylindrical portion that is received within said hub portion and supported thereon to a sealing ring on said cylindrical portion.

7. The vehicle drive system of claim 6 wherein said rotor includes a hub portion concentric with but spaced from said cylindrical portion, said centrifugal valve further including a drive shaft rotatably mounted in said housing, said drive shaft being operatively interconnected with said prime mover, with one end of said drive shaft being received within said rotor hub portion and flange means, attached to both said drive shaft and said rotor, for driving said rotor.

8. The vehicle drive system of claim 1 wherein said control valve assembly further includes a modulating balance valve downstream from said centrifugal valve, and incorporates said constriction means, said balancing valve including:

a. means forming a valve body having a bore therein closed on both ends and having an inlet port, a peripheral groove in communication with a first outlet port, a vent port, and a second outlet port, each of said ports communicating with a separate portion of said bore; and b. a spool element disposed in said bore having first and second peripheral grooves in constant communication with said inlet and vent ports, respectively, said peripheral grooves being spaced apart via a spool center land portion, with first and second opposed end cavities being defined by first and second spaced spool end land portions respectively, said spool element also having an internal conduit that provides constant communication between said housing peripheral groove and said second end cavity, there also being constant communication via said constriction means located in said spool first end land portion, between said spool first peripheral groove and said first end cavity, with the latter also communicating with said second outlet port, whereby said spool element is adapted to axially shift within said valve bore so as to either vent or pressurize said first outlet port as required to equalize the pressure in said first and second opposed end cavities.

9. The vehicle drive system of claim 8 wherein said inlet port is connected with said source, said first outlet port is connected with said lock-up clutch and said second outlet port is connected with said rotor inlet conduit.

10. The vehicle drive system of claim 9 wherein said spool center land portion serves to alternately connect said housing peripheral groove with one of said spool peripheral grooves, with the equalizing of said pressures in said opposed end cavities thus maintaining the same pressure in said lock-up clutch as produced by said centrifugal valve.

11. In a vehicle drive system including a torque converter for fluidically coupling a prime mover output member with a transmission input member, a hydraulically actuated lock-up clutch arranged to selectively bypass said torque converter and directly mechanically couple said output and input members, and a lock-up control valve assembly for providing a fluid signal to said lock-up clutch having a pressure proportional to the square of the rotating speed of said prime mover, said pressure fluid signal varying both the degree of engagement and disengagement of said lock-up clutch within a predetermined speed range, said control valve assembly comprising:

a. a source of fluid under pressure;

b. a control valve selectively communicating said clutch with said source and with a fluid drain, said control valve comprising:

i. a valve body defining a central cavity;

ii. rotor means rotatably journalled within said central cavity and drivably interconnected with said output member, said rotor means including a radial bore having a peripheral groove interconnected with said source via an inlet conduit;

iii. spool means slidably received within said radial bore and radially outwardly displaceable with a first force proportional to the square of the rotating speed of said output member;

iv. resilient bias means for biasing said spool means inwardly with a second force in opposition to said first force, said forces being substantially equal when said prime mover reaches a first predetermined speed;

v. a rotor means outlet conduit and valve means for regulating the flow of pressurized fluid from said peripheral groove into said outlet conduit when said prime mover exceeds the first predetermined speed, thereupon starting initial engagement of said clutch; and vi. said spool means also including means having a relatively small effective surface in communication with a reaction chamber, said reaction chamber being in constant communication with said peripheral groove for producing a third force augmenting said second force, said first force exceeding the combination of said second and third forces when said prime mover exceeds a second higher predetermined speed, thereupon completing the full engagement of said clutch.

12. The vehicle drive system of claim 11 further comprising constriction means fluidically interconnected with and located downstream from said control valve.

13. The vehicle drive system of claim 12 wherein said control valve assembly further includes a modulating balance valve downstream from said control valve and incorporates said constriction means, said balancing valve including:

a. means forming a valve body having a bore therein closed on both ends and having an inlet port, a peripheral groove in communication with a first outlet port, a vent port, and a second outlet port, each of said ports communicating with a separate portion of said bore; and b. a spool element disposed in said bore having first and second peripheral grooves in constant communication with said inlet and vent ports, respectively, said peripheral grooves being spaced apart via a spool center land portion, with first and second opposed end cavities being defined by first and second spaced spool end land portions respectively, said spool element also having an internal conduit that provides constant communication between said housing peripheral groove and said second end cavity, there also being constant communication via said constriction means located in said spool first end land portion, between said spool first peripheral groove and said first end cavity, with the latter also communicating with said second outlet port, whereby said spool element is adapted to axially shift between said valve bore ends so as to either vent or pressurize said first outlet port as required to equalize the pressure in said first and second opposed end cavities.

* * * * *